United States Patent [19]

Smith

[11] Patent Number: 4,817,060

[45] Date of Patent: Mar. 28, 1989

[54] PROCESS FOR DIRECTLY DETECTING THE PRESENCE OF HYDROCARBONS IN A ROCK FORMATION

[75] Inventor: George C. Smith, Cape Province, South Africa

[73] Assignee: Soekor (Proprietary) Limited, Cape Province, South Africa

[21] Appl. No.: 54,831

[22] Filed: May 26, 1987

[30] Foreign Application Priority Data

May 26, 1986 [ZA] South Africa .................. 86/3905

[51] Int. Cl.$^4$ .................. G01V 1/36; G01V 1/28
[52] U.S. Cl. .................. 367/52; 367/75; 364/421
[58] Field of Search .................. 367/52, 62, 63, 75; 364/421

[56] References Cited

U.S. PATENT DOCUMENTS

| | | | |
|---|---|---|---|
| 4,437,176 | 3/1984 | Moch | 367/52 |
| 4,534,019 | 8/1985 | Wiggins et al. | 367/75 |
| 4,604,734 | 8/1986 | Ruehle | 367/75 |
| 4,635,238 | 1/1987 | Gallagher et al. | 367/75 |
| 4,692,910 | 9/1987 | Sondergeld et al. | 367/75 |

FOREIGN PATENT DOCUMENTS 0113944 7/1984 European Pat. Off. .............. 367/75

OTHER PUBLICATIONS

Ostrander, W. J.; "Plane-Wave Reflection Coefficients for Gas Sands at Nonnormal Angles of Incidence"; *Geophysics;* vol. 49; 1984; pp. 1637–1648.

Gassaway, G. S., et al.; "Sample: Seismic Amplitude Measurement for Primary Lithology Estimation"; *Seismic* 24 (SEG abstract book); 1983; pp. 610 to 613.

Yu, G.; "Offset-Amplitude Variation and Controlled-Amplitude Processing"; *Geophysics;* vol. 50; 1985; pp. 2697 to 2708.

Stolt, R. H., et al., "Migration and Inversion of Seismic Data"; *Geophysics,* vol. 50; 1985; pp. 2458 to 2472.

Aki, K. I., et al.; *Quantitative Seismology;* W. H. Freeman and Co.; 1979; p. 153.

Shuey, R. T., "A Simplication of the Zeoppritz Equations"; *Geophysics;* vol. 50; 1985, pp. 609 to 614.

Castagna, J. P., et al., "Relationships between Compressional-Wave and Shear-Volume Velocities in Elastic Silicate Rocks"; *Geophysics;* vol. 50; 1985; pp. 571 to 581.

Gardner, G. H. F., et al.; "Formation Velocity and Density-The Diagnostic Basics for Stratigraphic Traps"; *Geophysics;* vol. 39; 1974; pp. 770–780.

Koefoed, O.; "On the Effect of Poisson's Ratios of Rock Strata on the Reflection Coefficients of Plane Waves"; *Geophysical Prospecting;* 1955; pp. 381 to 387.

*Primary Examiner*—Nelson Moskowitz
*Attorney, Agent, or Firm*—Ladas & Parry

[57] ABSTRACT

A process for directly detecting the presence of hydrocarbons in a rock formation includes generating a plurality of seismic rays at spaced intervals from one another above or within the surface of the rock formation being surveyed to form a normal move-out corrected common mid-point gather; determining an approximate angle of incidence for each seismic ray; applying predetermined weighting factors to time samples of each of the reflected rays before stacking the time samples to form a trace; extracting the reflectivity of compressional longitudinal waves (p-waves) and shear waves (s-waves) of each sample; determining the p-wave reflectivity as a function of the s-wave reflectivity; and subtracting the p-wave reflectivity so determined from the extracted p-wave reflectivity thereby to define a fluid factor which gives a direct indication of the presence of hydrocarbons in the rock formation being surveyed.

24 Claims, 11 Drawing Sheets

PROCESS FOR DIRECTLY DETECTING THE PRESENCE OF HYDROCARBONS IN A ROCK FORMATION

FIELD OF INVENTION

THIS INVENTION relates to a process of detection. More particularly, the invention relates to a process for directly detecting the presence of hydrocarbons in a rock formation.

BACKGROUND TO THE INVENTION

The Applicants are aware of various models which have been proposed for facilitating the detection of hydrocarbons in a rock formation. So, for example, in U.S. Pat. No. 4,534,019 to Wiggins, et al and corresponding European Patent Application No. 83300227.2, a method is proposed for determining the reflectivities of shear waves (s-waves), of geologic formations. However, a problem with this method is that data representative of the presence of hydrocarbons in the geologic formation cannot be obtained directly.

Also, in recent times, variation of amplitudes of reflected compressional longitudinal waves (p-waves) as a function of the angles of incidence (or offset) has received much attention. The majority of recent publications on this subject have included some form of forward modelling in which the amplitudes of reflections in a common mid-point (CMP) gather are compared to those predicted by a model (see, for example, in this regard Ostrander, W.J.; "Plane-wave Reflection Coefficients for Gas Sands at Nonnormal Angles of Incidence"; Geophysics, Volume 49, 1984, pp1637–1648; Gassaway, G.S., and Richgels, H.J., SAMPLE: "Seismic Amplitude Measurement for Primary Lithology Estimation": 53rd Annual International SEG Meeting, September 1983, Las Vagas; Abstract Book, pp610–613; Yu, G., "Offset-amplitude Variation and Controlled-Amplitude Processing" Geophysics, Volume 50, 1985, pp2697–2708.). The modelling is generally done using the Zoeppritz equations or some simplified version thereof. However, a problem with this system is that it is very time-consuming and complicated. Also it does not give a direct indication of the presence of hydrocarbons in the rock formation.

An alternative approach is to use curve fitting techniques to invert the seismic traces to a physical model directly. The principle of this method is outlined by Stolt, R.H., and Weglein, A.B.; "Migration and Inversion of Seismic Data", Geophysics, Volume 50, 1985 pp2458–2472. Stolt and Weglein use wave equation analysis to show that the extraction of elastic parameter changes from reflection seismic data is obtained by a set of weighted stacks. However, the shortcoming of this paper is that no mention is made of how the weighting factors are obtained.

SUMMARY OF THE INVENTION

According to the invention, there is provided a process for directly detecting the presence of hydrocarbons in a rock formation which includes generating a plurality of seismic rays at spaced intervals from one another above or within the surface of the rock formation being surveyed to form a normal moveout corrected common mid-point gather;

determining an approximate angle of incidence for each seismic ray;

applying predetermined weighting factors to time samples of each of the reflected rays before stacking the time samples to form a trace;

extracting the reflectivity of compressional longitudinal waves (p-waves) and shear waves (s-waves) of each sample;

determining the p-wave reflectivity as a function of the s-wave reflectivity; and subtracting the p-wave reflectivity so determined from the extracted p-wave reflectivity thereby to define a fluid factor which gives a direct indication of the presence of hydrocarbons in the rock formation being surveyed.

The process may include initially determining the average velocities of the seismic rays through the rock formation.

The process may include determining the average velocities from stacking velocities or borehole information. From the average velocities, the process may include extracting p-wave interval velocities of the rays between interfaces of layers constituting the rock formation.

To determine the approximate angles of incidence, a smooth velocity function is required. Hence, the process may include utilising curve-fitting techniques to generate a smooth interval velocity function from the p-wave interval velocities. The curve-fitting techniques utilised may be cubic splines curves.

Once the interval velocity function is known, the process may include determining the approximate angles of incidence of each ray using iterative ray tracing.

The process may then include determining the ratio of p-wave velocities and s-wave velocities by means of an empirical relationship. The empirical relationship may be either a universal or local relationship depending on the lithology of the rock formation being surveyed. When a local relationship is used, the process may include deriving the relationship from cross-plots of borehole measurements using a conventional s-wave logging technique.

The process may also include determining the density of the layers of the rock formation in terms of the velocities of the rays.

The weighting factors to be applied to the samples may be both time and offset variant and are dependent on the determined interval velocity function, the ratio of p-wave velocities to s-wave velocities, and an offset pattern of the common mid-point gather, including a mute pattern. The weighting factors may include both positive and negative values.

The process may then include displaying the outputs of the weighted stacks so formed as traces representing the p-wave reflectivity and s-wave reflectivity, both of which have a time scale of a normal seismogram, such a time scale being representative of depth.

The process may include determining the p-wave reflectivity as a function of the s-wave reflectivity by using the relationship employed to determine the ratio of p-wave velocities to s-wave velocities. Instead the process may include determining the p-wave reflectivity as a function of the s-wave reflectivity by comparing amplitudes of the traces representing the p-wave reflectivity and the s-wave reflectivity.

The fluid factor formed by substracting the determined p-wave reflectivity from the extracted p-wave reflectivity should be close to zero for all water-bearing rock, but will be negative at the top of a gas sand and positive at the bottom. Hence, the process may include representing the fluid factor in the form of a normal seismogram, such fluid factor having approximately zero deflection except where gas is present.

BRIEF DESCRIPTION OF THE DRAWINGS

The invention is now described by way of examples with reference to the accompanying drawings, in which FIG. 1 shown a schematic diagram of the path of a seismic ray at an interface in a rock formation;

FIG. 10 shows values of reflectivities derived from the model of FIG. 7; and.

FIG. 11 shows a flowchart setting out the various steps of the invention described therein

DETAILED DESCRIPTION OF THE INVENTION

Figure 1:
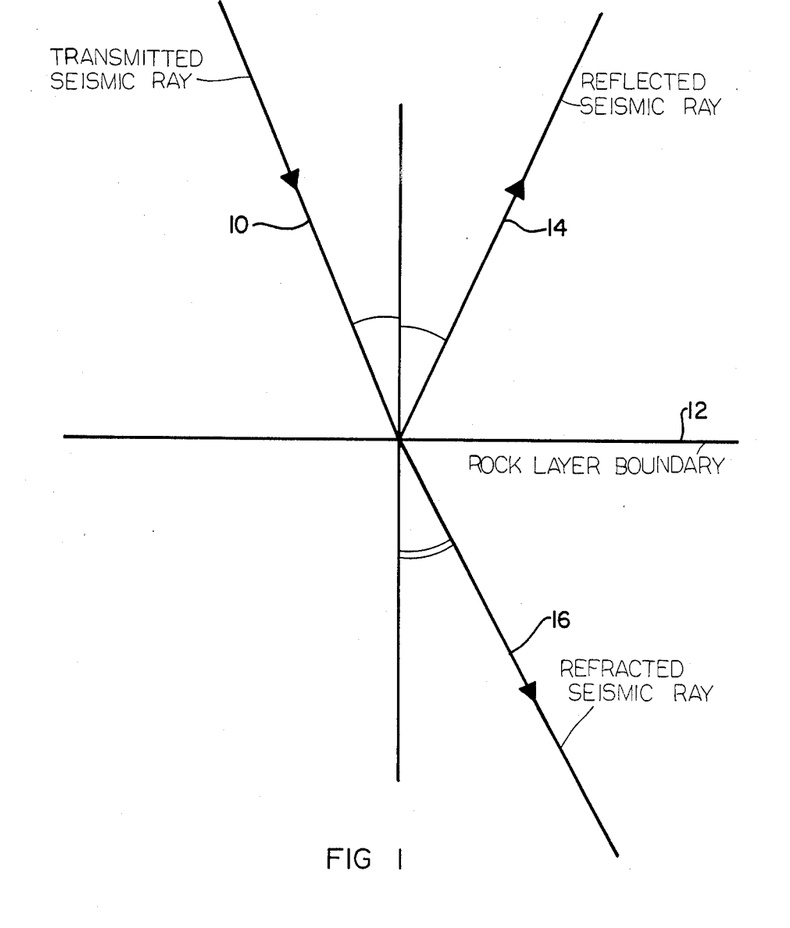

Referring to FIG. 1, a schematic diagram of the path of a transmitted seismic ray 10 is shown. At an interface 12 between layers of a rock formation being surveyed, a portion of the transmitted ray 10 is reflected as a reflected ray 14 and a portion of the ray 10 is transmitted or refracted as a refracted ray 16.

The Zoeppritz equations can be used to provide reflection co-efficients of a reflected seismic ray. The Zoeppritz equations describe the relationships between incident, reflected and transmitted or refracted compressional longitudinal waves hereinafter referred to as p-waves) and shear waves ((hereinafter referred to as s-waves) on both sides of the interface 12.

From Aki, K.I. and Richards, P.G., Quantitative Seismology; W.H. Freemand and Co., 1979, p153; a simplified form of the Zoeppritz equation can be written as $$R \approx \frac{1}{2}\left(1 - 4\frac{W^2}{V^2}\sin^2\theta\right)\frac{\Delta\rho}{\rho} + \frac{1}{2\cos^2\theta}\frac{\Delta V}{V} - 4\frac{W^2}{V^2}\sin^2\theta\frac{\Delta W}{W} \tag{1}$$

where
R = reflection co-efficient of p-waves
W = average of s-wave velocities across the interface 12
V = average of p-wave velocities $\rho$ = average of density
$\theta$ = average of angles of incidence and angles of transmission of the p-wave
$\Delta V$ = change in V across the interface 12
$\Delta W$ = change in W across the interface 12;
$\Delta \rho$ = change in $\rho$ across the interface 12.

For most reflection seismic surveys, it is reasonable to assume that the relative changes of property, ie $(\Delta V/V)$, $(\Delta W/W)$, and $(\Delta\rho/\rho)$, are sufficiently small that second order terms can be neglected and that the average angle of incidence does not approach 90°.

In terms of the identity:

$$\frac{1}{\cos^2\theta} = 1 + \tan^2\theta$$

equation (1) can be rearranged to give:

$$R \approx \frac{1}{2}\left(\frac{\Delta V}{V} + \frac{\Delta\rho}{\rho}\right) - 2\frac{W^2}{V^2}\left(2\frac{\Delta W}{W} + \frac{\Delta\rho}{\rho}\right)\sin^2\theta + \frac{1}{2}\frac{\Delta V}{V}\tan^2\theta \tag{2}$$

The terms can be rearranged so that the co-efficients become increasingly important towards the right side of the equation with increasing angles of incidence. Hence, following Shuey, R.T., "A Simplification of the Zoeppritz Equations": Geophysics, Volume 50, 1985, pp609-614, equation (2) can be written as follows:

$$R \approx \frac{1}{2}\left(\frac{\Delta V}{V} + \frac{\Delta\rho}{\rho}\right) + \frac{1}{2}\left(\frac{\Delta V}{V} - 4\frac{W^2}{V^2}\cdot\frac{\Delta W}{W} - 2\frac{W^2}{V^2}\frac{\Delta\rho}{\rho}\right)\sin^2\theta + \frac{1}{2}\frac{\Delta V}{V}(\tan^2\theta - \sin^2\theta) \tag{3}$$

To be able to find the terms $(\Delta V/V)$, $(\Delta W/W)$ and $(\Delta\rho/\rho)$ in the above equation, it is necessary firstly to determine the angles of incidence and the factor $(W/V)$, ie the ratio of s-wave velocity to p-wave velocity.

To determine the angle of incidence of each sample in a normal move-out common mid-point (CMP) gather, an iterative ray tracing technique can be employed. Before ray tracing can be carried out, it is necessary to specify a p-wave interval velocity function, ie. the velocity of the p-wave between interfaces of layers constituting the rock formation. The interval velocities can be obtained from the average velocity of the p-wave through the rock formation. This average velocity can be determined from stacking velocities, borehole information if available, or the like.

Figure 2:
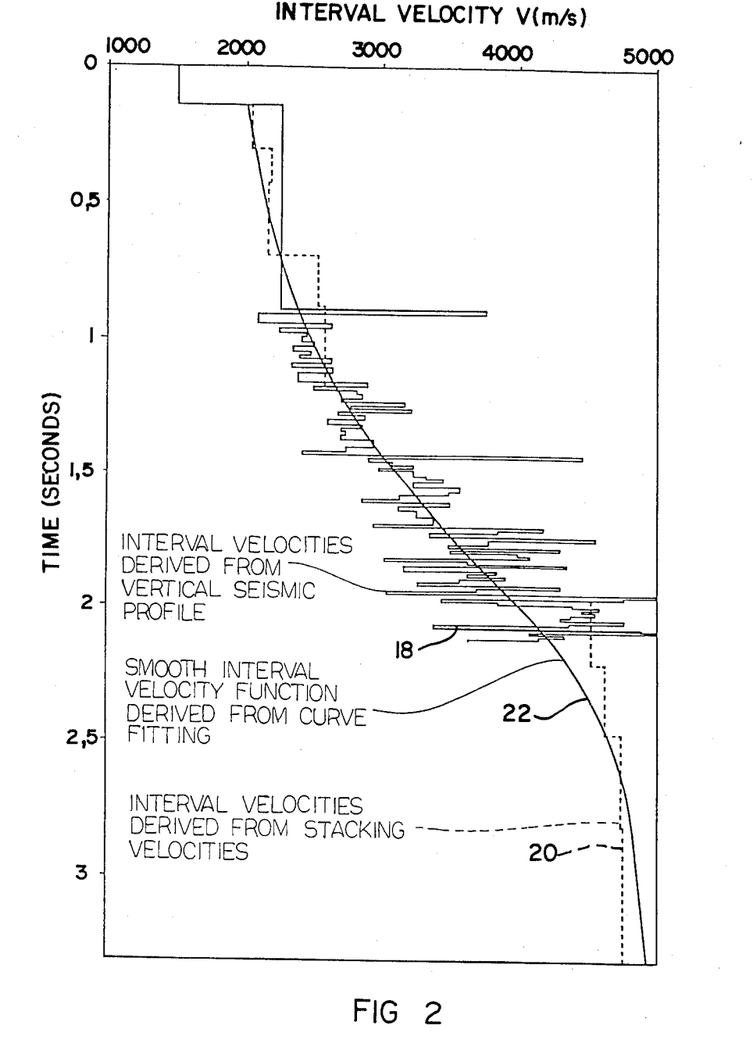
FIG. 2 shows a model of an interval velocity function used in the process of directly detecting the presence of gas in a rock formation in accordance with the invention.
Figure 2:
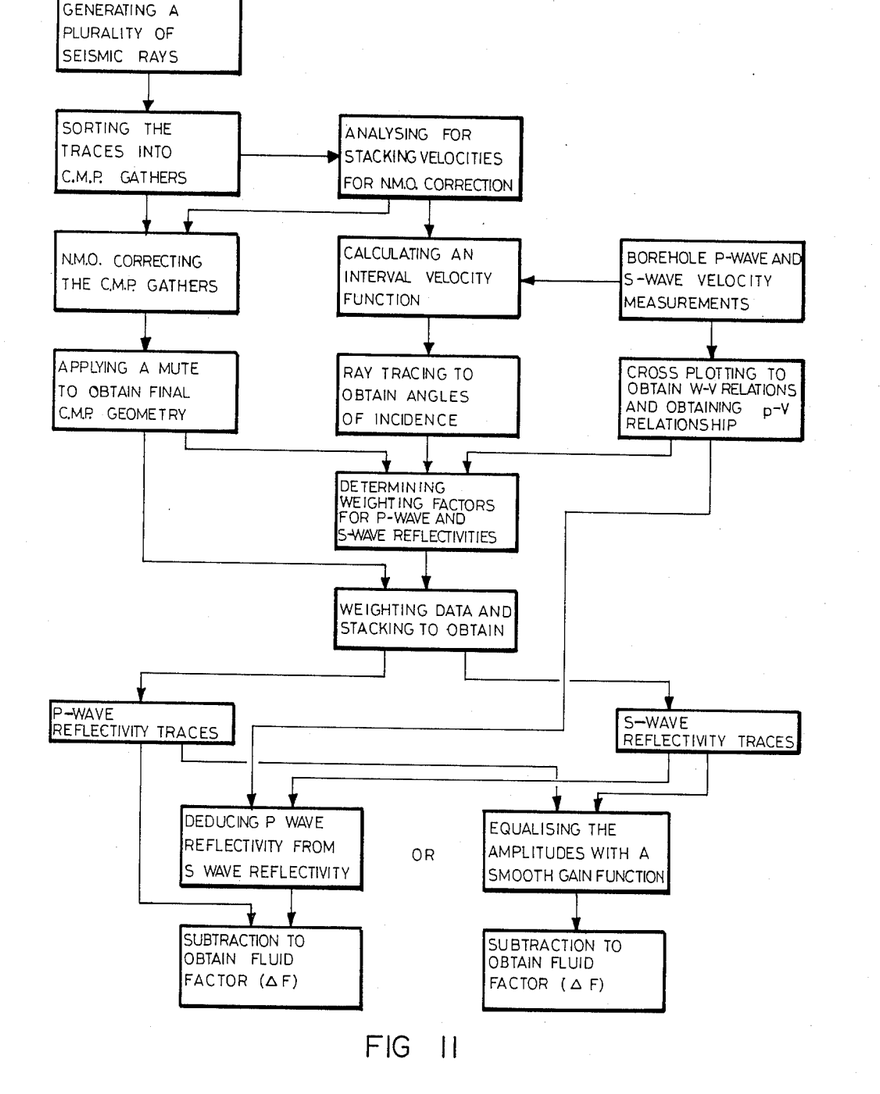

The interval velocities determined from the average velocities are not well known in detail as shown in FIG. 2, in which reference numeral 18 shows the interval velocities derived from a vertical seismic profile, and reference numeral 20 shows the interval velocities derived from stacking velocities. By using a curve fitting technique such as a cubic splines curve fitting method a smooth interval velocity function can be obtained as shown by line 22 in FIG. 2. An assumption is made that there is horizontal layering, ie. no dip in the layers of the rock formation, and then with the determined smooth interval velocity function, iterative ray tracing can be carried out to determine the angles of incidence.

It is now necessary to determine the factor (W/V) in equation (2). Since a seismic trace only give reflectivities and not actual values of W and V, it is necessary to make some assumptions about (W/V). Castagna, J.P., Batzle, M.L., and Eastwood, R.L. "Relationships Between Compressional Wave and Shear Wave Velocities in Clastic Silicate Rocks". Geophysics, Volume 50, 1985 pp571-581 gives a relationship between V and W which has been derived for water-saturated clastic silicate rocks in the form:

$$V = 1360 + 1,16 \, W \text{ (velocities in metres per second)} \tag{4}$$

This relationship, together with the smooth p-wave interval velocity function as shown in FIG. 2 can be used to provide a value of (W/V) for each time sample of the CMP gather.

The above equation may not appropriate for other types of rocks and other relationships may have to be used. Such other relationships may be derived from cross-plots of borehole measurements, using one of the s-wave logging techniques currently available.

It would now appear that, with the determined angles of incidence, $\theta$, and the ratio of the velocities, (W/V), equation (2) could be fitted to amplitudes of the seismic traces for each time sample of the CMP gather to yield the co-efficients of the equation, and hence the reflectivities $(\Delta V/V)$, $(\Delta W/W)$ and $(\Delta \rho/\rho)$. However a good estimate of all three is difficult to obtain. In equation (2) we have a co-efficient of $\sin^2\theta$ and $\tan^2\theta$. For moderate angles of incidence the shapes of a $\sin^2\theta$ curve and a $\tan^2\theta$ curve are very similar, and therefore only slight inaccuracies in the data could result in a wrong distribution between the two terms. This is also apparent from equation (3), with the last term only becoming effective at large angles of incidence, and will be determined very inaccurately.

It is thus necessary to make a further assumption. An assumption can be made regarding the relationship between p-wave velocity and density. From Gardner, G.H.F., Gardner, L.W., and Gregory, A.R., "Formation Velocity and Density—the Diagnostic Basics for Stratigraphic Traps": Geophysics, Volume 38, 1974, pp770-780, a relationship is given for water-saturated rocks excluding evaporites, as density being proportional to the 4th root of velocities. This leads to the equation:

$$\frac{\Delta \rho}{\rho} \simeq \frac{1}{4} \frac{\Delta V}{V} \tag{5}$$

Substituting equation (5) into equation (2) gives:

$$R \simeq \frac{5}{8} \frac{\Delta V}{V} - \frac{W^2}{V^2} \left( 4 \frac{\Delta W}{W} + \frac{1}{2} \frac{\Delta V}{V} \right) \sin^2\theta + \frac{1}{2} \frac{\Delta V}{V} \tan^2\theta \tag{6}$$

Figure 3:
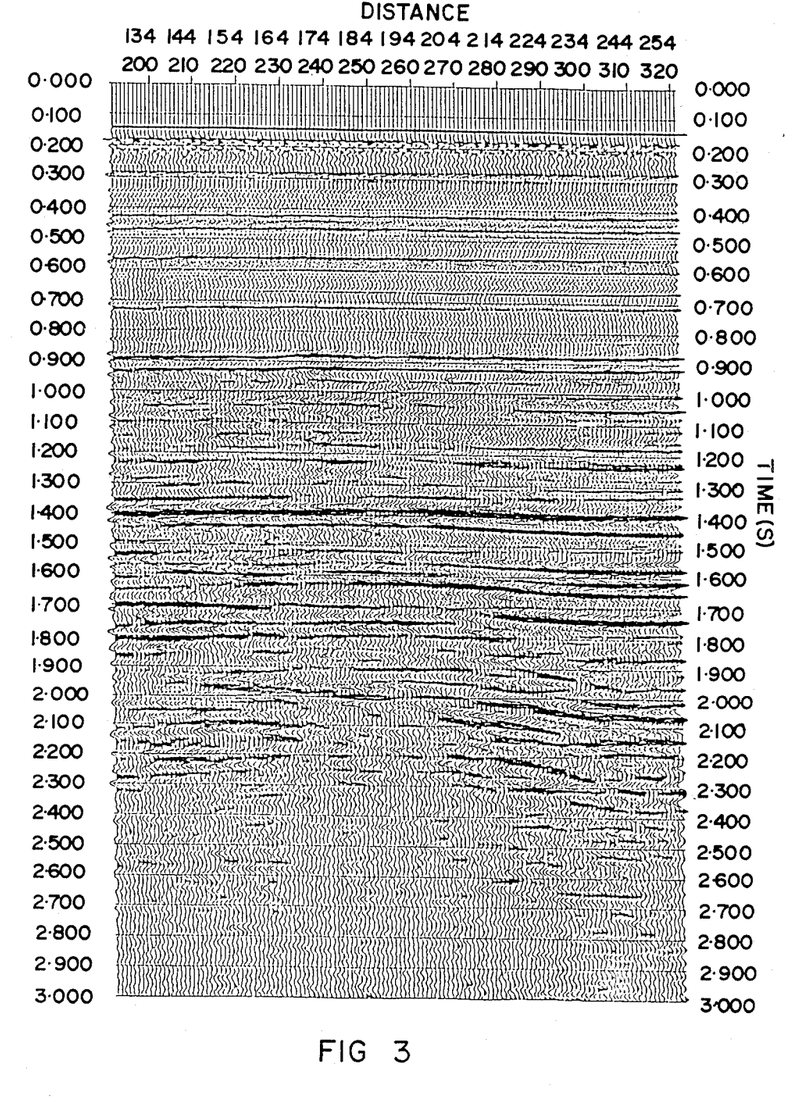
FIG. 3 shows a p-wave reflectivity seismogram obtained by applying weighting factors and stacking the data obtained from a common mid-point gather.
Figure 4:
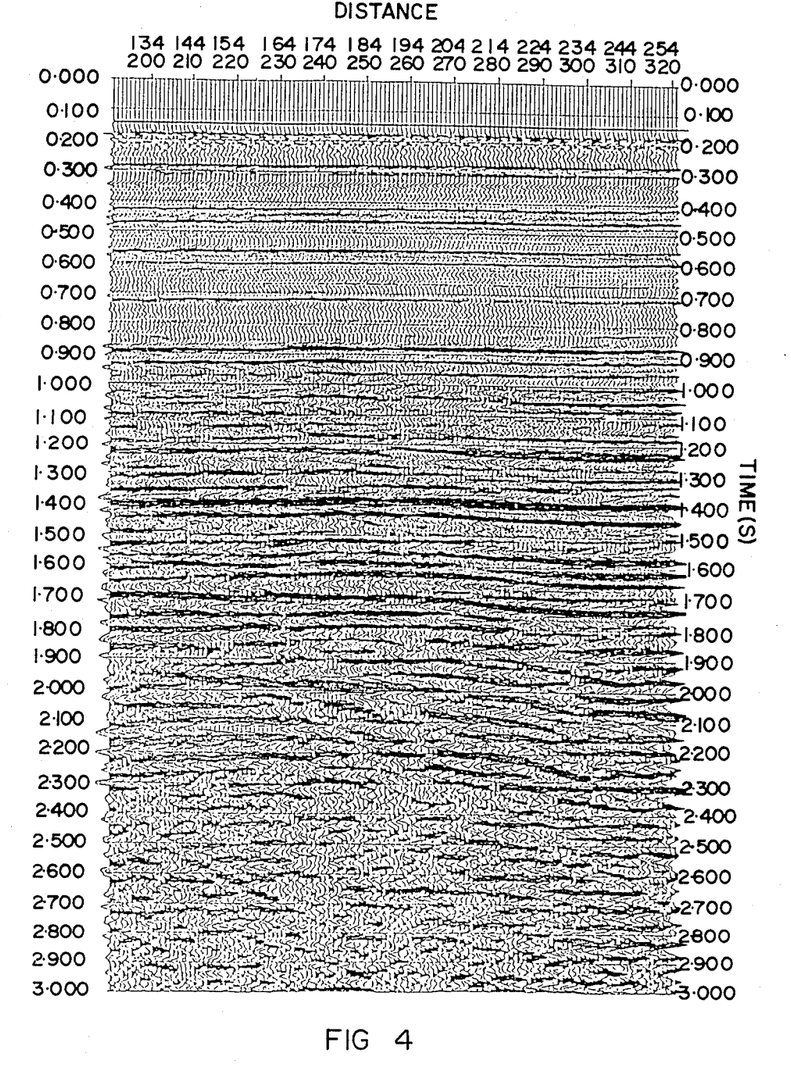
FIG. 4 shows an s-wave reflectivity seismogram obtained by applying weighting factors and stacking the data.

By curve fitting to seismic data, the reflectivities $(\Delta V/V)$ and $(\Delta W/W)$ can be determined. Curve fitting to the amplitudes across the CMP gather is equivalent to a weighted stack. Weighting factors can thus be applied to each sample of the CMP gather. The weighting factors to be applied are both offset and time variant, and depend on the p-wave interval velocity function, the relationship used to determine the ratio of the p-wave velocity to s-wave velocity, and the offset geometry of the CMP gather including a mute pattern. Once the weighting factors have been determined, weighted stacks can be formed. The outputs of the weighted stacks will be traces representing the p-wave reflectivity, $(\Delta V/V)$, and the s-wave reflectivity, $(\Delta W/W)$, both with the time scale of a normal seismogram, ie. related to depth by the p-wave velocity, as shown in FIGS. 3 and 4 respectively.

To obtain the weighting factors to be applied, equation 6 can be rewritten in the form:

$$R = A_i \frac{\Delta V}{V} + B_i \frac{\Delta W}{W} \tag{7}$$

where $$A_i = \frac{5}{8} - \frac{1}{2} \frac{W^2}{V^2} \sin^2\theta_i + \frac{1}{2} \tan^2\theta_i \tag{8}$$

and $$B_i = -4 \frac{W^2}{V^2} \sin^2\theta_i \tag{9}$$

for $i = 1 \ldots n$ where n is the number of traces contributing to the normal move out corrected CMP gather at the particular time sample under consideration. It will be noted that $A_i$ and $B_i$ are functions only of the p-wave velocity model and the (W/V) model, and not of the data.

If the actual amplitude of each offset sample is $a_i$ then the mean square error of all amplitudes compared with the model curve is given by:

$$\epsilon = \sum_{i=1}^{n} \left( A_i \frac{\Delta V}{V} + B_i \frac{\Delta W}{W} - a_i \right)^2 \tag{10}$$

$$= \left(\frac{\Delta V}{V}\right)^2 \sum_{i=1}^{n} (A_i^2) + \left(\frac{\Delta W}{W}\right)^2 \sum_{i=1}^{n} (B_i^2) + \sum_{i=1}^{n} (a_i^2) \tag{11}$$
$$+ 2 \frac{\Delta V}{V} \cdot \frac{\Delta W}{W} \cdot \sum_{i=1}^{n} (A_i B_i) - 2 \frac{\Delta V}{V} \sum_{i=1}^{n} (A_i a_i)$$
$$- 2 \frac{\Delta W}{W} \sum_{i=1}^{n} (B_i a_i)$$

$(\Delta V/V)$ and $(\Delta W/W)$ must be varied so that the error is minimized. Hence, taking partial derivatives of the error with respect to $(\Delta V/V)$ and $(\Delta W/W)$, $$\frac{\partial \epsilon}{\partial \left(\frac{\Delta V}{V}\right)} = \tag{12}$$

$$2 \frac{\Delta V}{V} \sum_{i=1}^{n} (A_i^2) + 2 \frac{\Delta W}{W} \sum_{i=1}^{n} (A_i B_i) - 2 \sum_{i=1}^{n} (A_i a_i)$$

and, $$\frac{\partial \epsilon}{\partial \left(\frac{\Delta W}{W}\right)} = \tag{13}$$

$$2 \frac{\Delta V}{V} \sum_{i=1}^{n} (A_i B_i) + 2 \frac{\Delta W}{W} \sum_{i=1}^{n} (B_i^2) - 2 \sum_{i=1}^{n} (B_i a_i)$$

Setting equations (12) and (13) to zero results in the two simultaneous equations:

$$\begin{bmatrix} \sum_{i=1}^{n} (A_i^2) & \sum_{i=1}^{n} (A_iB_i) \\ \sum_{i=1}^{n} (A_iB_i) & \sum_{i=1}^{n} (B_i^2) \end{bmatrix} \begin{bmatrix} \frac{\Delta V}{V} \\ \frac{\Delta W}{W} \end{bmatrix} = \begin{bmatrix} \sum_{i=1}^{n} (A_ia_i) \\ \sum_{i=1}^{n} (B_ia_i) \end{bmatrix} \quad (14)$$

Solving for ($\Delta V/V$) and ($\Delta W/W$) gives $$\frac{\Delta V}{V} = \sum_{i=1}^{n} \left\{ a_i \left[ \frac{A_i \sum_{j=1}^{n} (B_j^2) - B_i \sum_{j=1}^{n} (A_jB_j)}{\sum_{j=1}^{n} (A_j^2) \sum_{j=1}^{n} (B_j^2) - \sum_{j=1}^{n} (A_jB_j) \sum_{j=1}^{n} (A_jB_j)} \right] \right\} \quad (15)$$

$$\frac{\Delta W}{W} = \sum_{i=1}^{n} \left\{ a_i \left[ \frac{B_i \sum_{j=1}^{n} (A_j^2) - A_i \sum_{j=1}^{n} (A_jB_j)}{\sum_{j=1}^{n} (A_j^2) \sum_{j=1}^{n} (B_j^2) - \sum_{j=1}^{n} (A_jB_j) \sum_{j=1}^{n} (A_jB_j)} \right] \right\} \quad (16)$$

Equations (15) and (16) are written in this form to show that the right hand side of each is a weighted stack, with the weighting factors to be applied to each sample being the term in square brackets.

To determine the lithological, or fluid content of the rock formation, Poisson's ratio can be investigated, (cf Shuey 1985 (supra) and Koefoed, O., "On the Effect of Poisson's Ratio of Rock Strata on the Reflection Coefficients of Plane Waves", Geophys. Prosp., 1955 pp281-387). However, it is more convenient to determine the ratio of (V/W) which is related to Poisson's ratio by:

$$\frac{V}{W} = \left( \frac{1 - \sigma}{\frac{1}{2} - \sigma} \right)^{\frac{1}{2}} \quad (17)$$

where $\rho$ is Poisson's ratio.

Defining the ratio (V/W) as q, then the quantity ($\Delta q/q$) can be considered. The quantity ($\Delta q/q$) is referred to as the "pseudo-Poisson's ratio reflectivity". The quantity ($\Delta q/q$) is the difference between the p-wave reflectivity and the s-wave reflectivity, ie.

$$\frac{\Delta q}{q} = \frac{\Delta V}{V} - \frac{\Delta W}{W} \quad (18)$$

Figure 5:
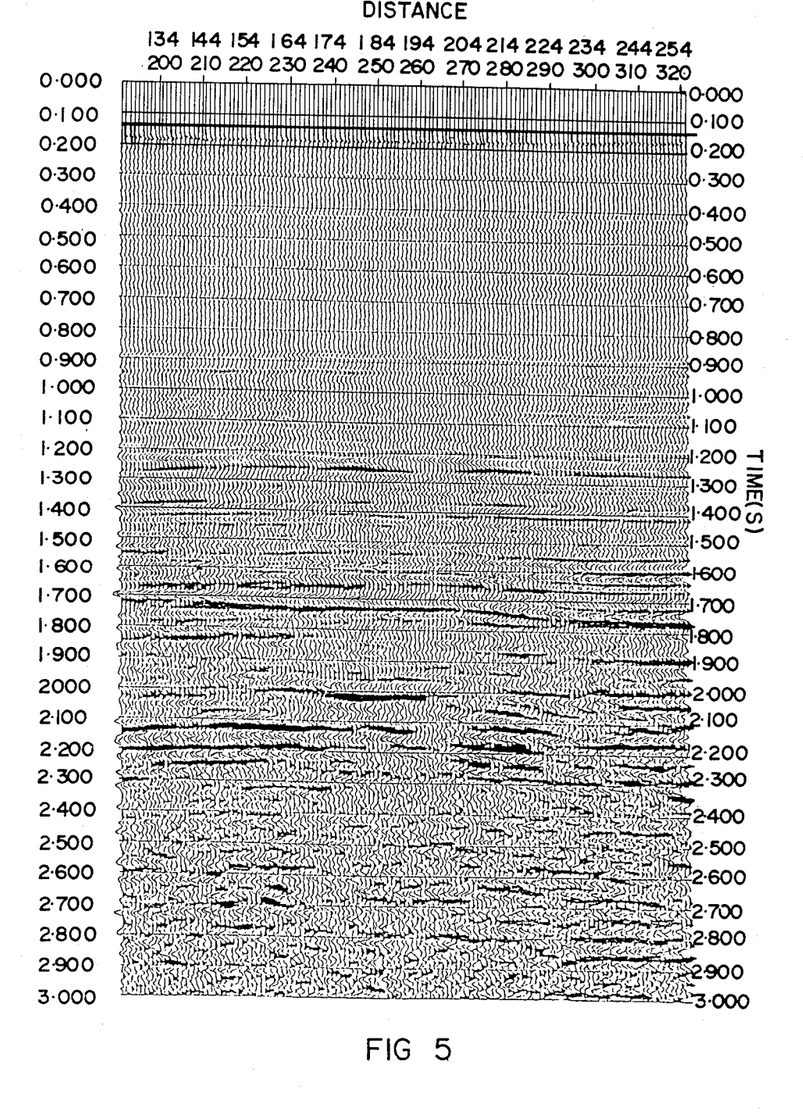
FIG. 5 shows a "psuedo-Poisson's ratio reflectivity" seismogram obtained by applying weighting factors and stacking the data.

A ($\Delta q/q$) trace can be formed by subtracting the ($\Delta W/W$) trace from the ($\Delta V/V$) trace, the ($\Delta q/q$) trace having a form as shown in FIG. 5.

Alternatively, the weights applied to the s-wave reflectivity trace can be subtracted from the weights applied to the p-wave reflectivity trace to arrive at a new set of weights to give ($\Delta q/q$) directly.

Now, to determine the presence of gas, reference again must be made to equation (4). Substitution of gas for water in water-bearing clastic silicates causes a reduction of the p-wave velocity while the s-wave velocity remains largely unaffected since a gas cannot support shear. Hence, a fluid factor, $\Delta F$, can be defined.

From equation (4), by differentiation, $$\Delta V \approx 1.16 \Delta W \quad (19)$$

and $$\frac{\Delta V}{V} \approx 1.16 \frac{W}{V} \cdot \frac{\Delta W}{W} \quad (20)$$

$\Delta F$ can then be defined as the difference between the extracted p-wave reflectivity and the reflectivity of the p-wave as deduced from the reflectivity of the s-wave, ie. equation (20). Hence, $$\Delta F = \frac{\Delta V}{V} - 1.16 \frac{W}{V} \cdot \frac{\Delta W}{W} \quad (21)$$

$\Delta F$ can also be constructed by equalizing the amplitudes of the ($\Delta V/V$) and ($\Delta W/W$) traces with a smooth gain function, and then subtracting the traces to give a $\Delta F$ trace with generally low amplitudes.

Figure 6:
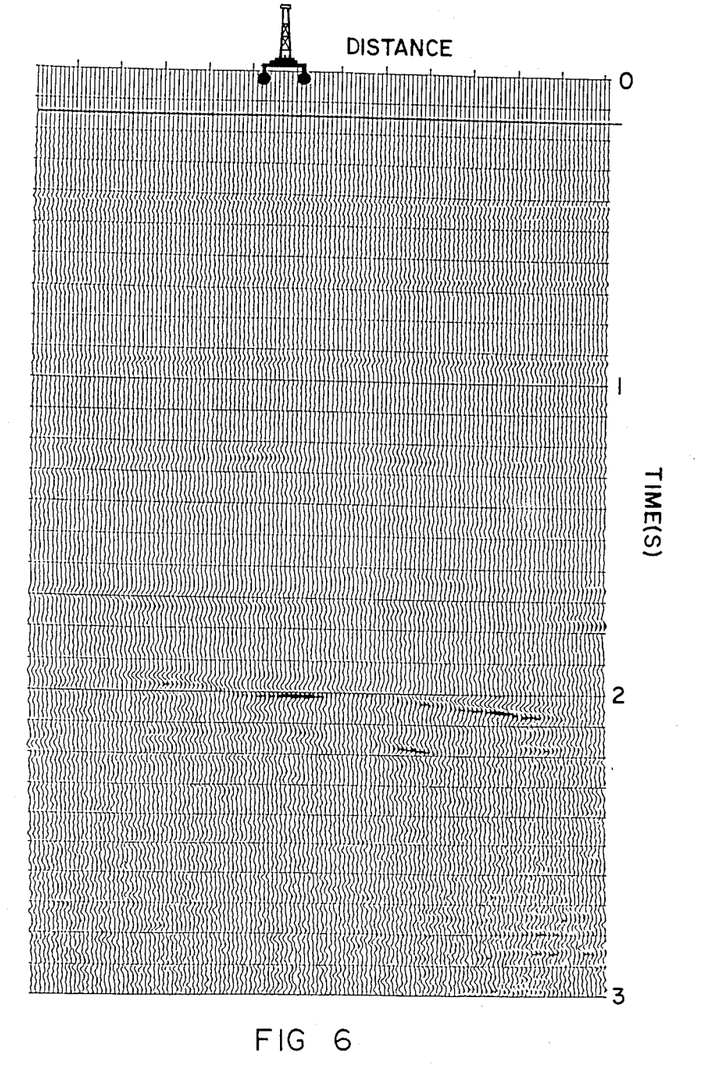
FIG. 6 shows a "fluid factor" seismogram generated in accordance with the process of the invention.

The fluid factor $\Delta F$ can be represented as a normal seismogram as shown in FIGS. 6. $\Delta F$ will be close to zero for all water bearing rocks, but will be negative at the top of a gas sand and positive at the bottom thereof. From FIG. 6, it will be noted that there are almost no perturbations on the traces except at approximately 2 seconds where a "bright spot" appears, the "bright spot" signalling the presence of gas.

Figure 7:
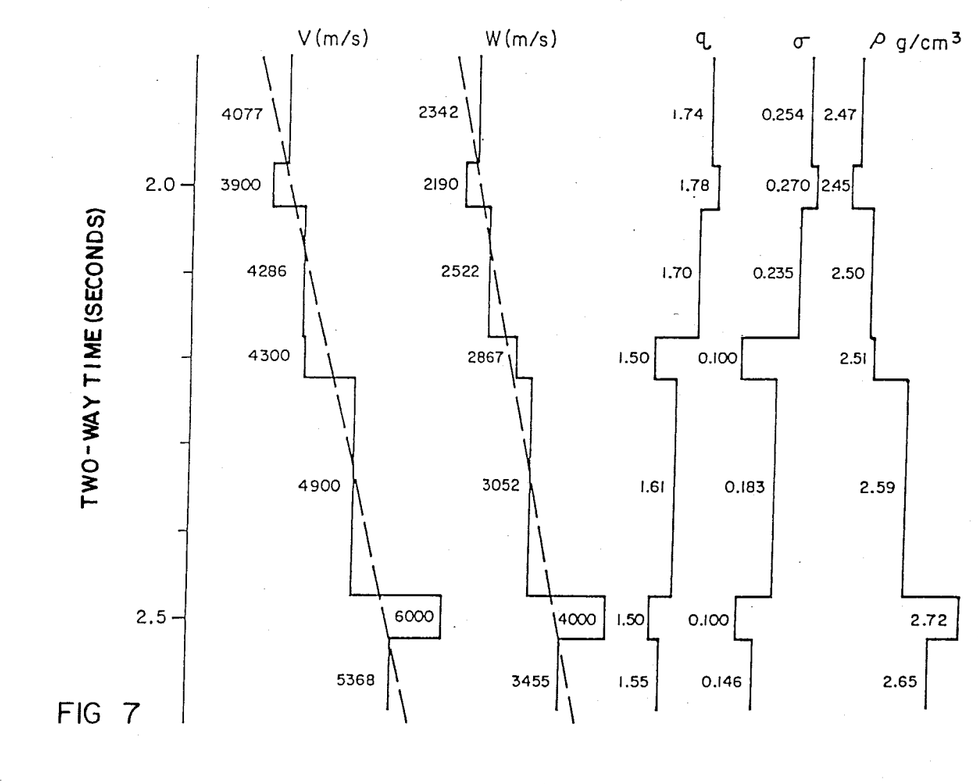
FIG. 7 shows parameters of a model used for testing the process.
Figure 8:
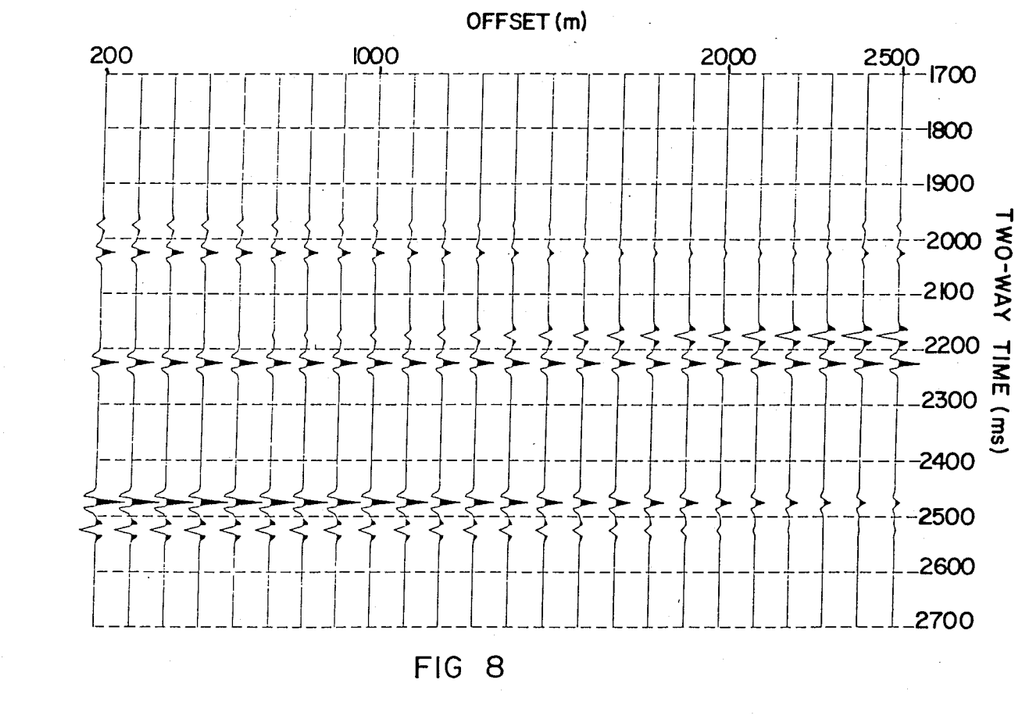
FIG. 8 shows a synthetic common mid-point gather generated using the parameters shown in FIG. 7.
Figure 9:
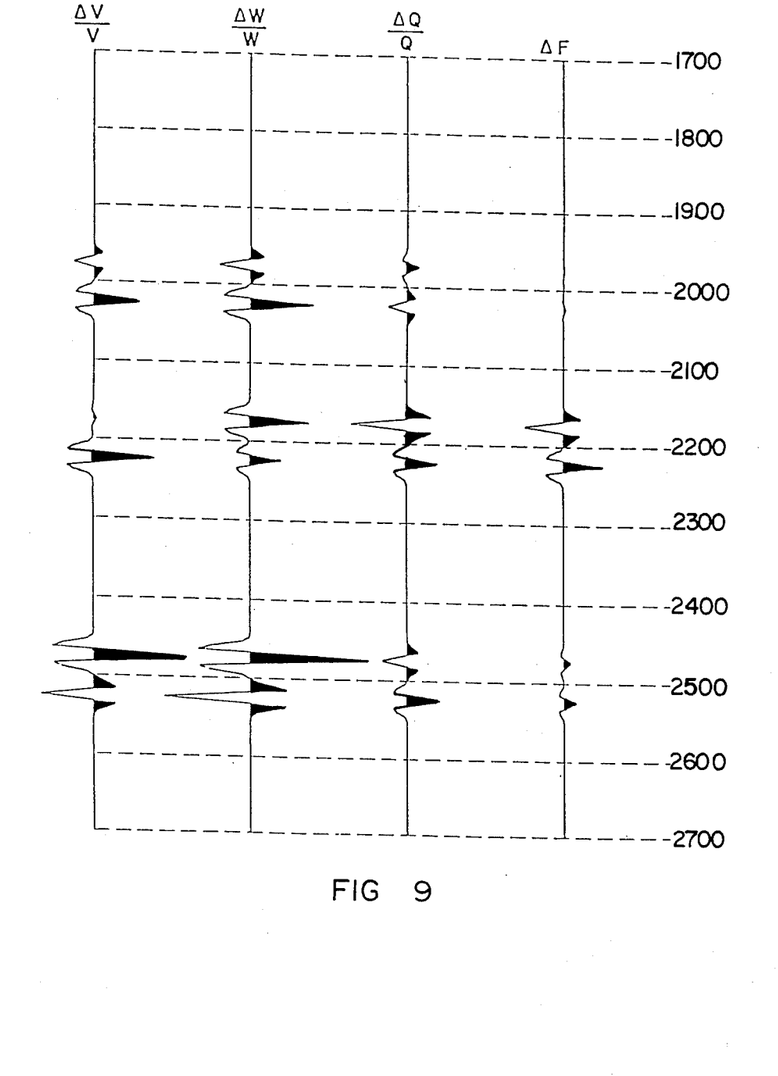
FIG. 9 shows traces of calculated reflectivity using the gather of FIG. 8 to which weighting factors have been applied.
Figure 10:
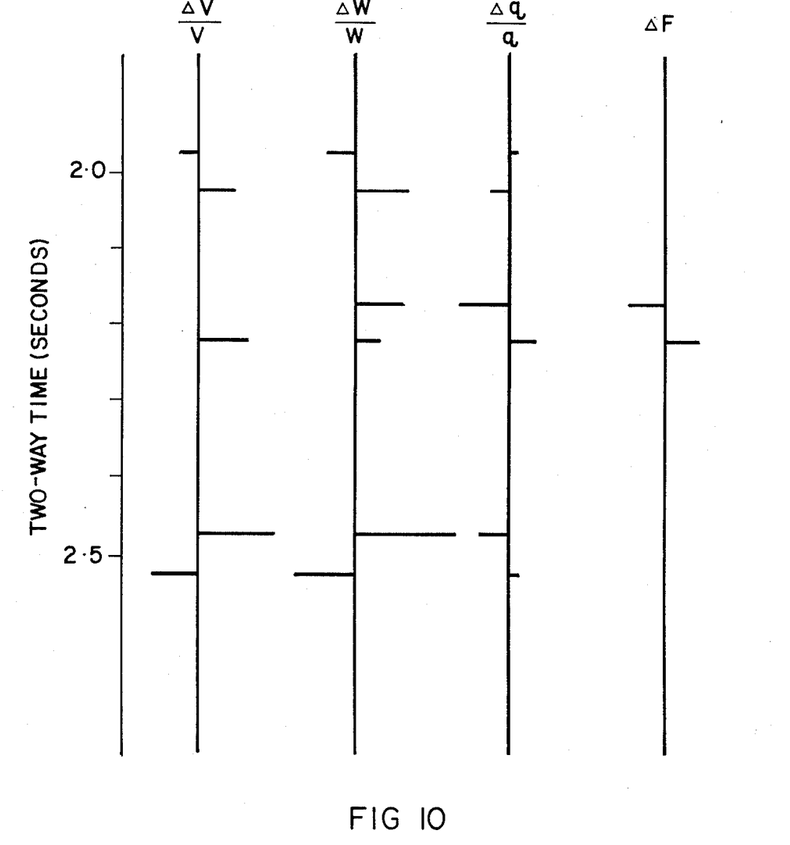

Referring now to FIG. 7, synthetic data is given. All the layers relate to the relationship given by equation (4), except at approximately 2.2 seconds where the high s-wave velocity relative to the p-wave velocity is an indication of the presence of gas. FIG. 8 shows a CMP gather using the exact Zoeppritz equation with ray tracing through the exact model. Applying weighted stacks to the gather of FIG. 8 gives the reflectivities as shown in FIG. 9. The values of the reflectivities derived using the data of FIG. 7 are shown in FIG. 10.

From FIG. 9 it is clear that the only significant perturbations in the $\Delta F$ trace are where gas is present.

It will be seen from FIGS. 6 and 9 that the presence of gas in a rock formation can be directly detected using the process as described above. Hence, it is an advantage of the invention that the need for drilling to detect gas can largely be obviated. The only borehole data used in the above process was that to determine the average velocities, from which the interval velocities can be derived. The average velocities can, however, be determined by stacking velocities, and hence no borehole data at all are necessary.

I claim:

1. A process for directly detecting the presence of hydrocarbons in a rock formation which includes
   generating a plurality of seismic rays at spaced intervals from one another above or within the surface of the rock formation being surveyed to form a normal move-out corrected common mid-point gather;
   determining at least approximately an angle of incidence for each seismic ray;
   determining weighting factors, and applying the weighting factors to time samples of each of the reflected rays before stacking the time samples to form a trace;

extracting the reflectivity of compressional longitudinal waves (p-waves) and shear waves (s-waves) of each sample;

determining the p-wave reflectivity as a function of the s-wave reflectivity by using a relationship employed to determine the ratio of p-wave velocities to s-wave velocities; and deriving a fluid factor by subtracting the p-wave reflectivity so determined from the extracted p-wave reflectivity, the fluid factor giving a direct indication of the presence of hydrocarbons in the rock formation being surveyed.

2. The process as claimed in claim 1, which includes determining the average velocities of the seismic rays through the rock formation.

3. The process as claimed in claim 2, which includes determining the average velocities from stacking velocities or borehole information.

4. The process as claimed in claim 2, which includes extracting from the determined average velocities, p-wave interval velocities of the rays between interfaces of layers constituting the rock formation.

5. The process as claimed in claim 4, which includes utilizing curve fitting techniques to generate an interval velocity function from the p-wave interval velocities.

6. The process as claimed in claim 5 in which the curve-fitting techniques utilised are cubic splines curves.

7. The process as claimed in claim 5 which includes determining the angles of incidence of each ray from the interval velocity function using iteractive ray tracing.

8. The process as claimed in claim 7, which includes determining the ratio of p-wave velocities and s-wave velocities by means of a relationship which is dependent on the lithology of the rock formation being surveyed.

9. The process as claimed in claim 8, which includes deriving the relationship from cross-plots of borehole measurements using p-wave and s-wave velocity logging.

10. The process as claimed in claim 4, which includes determining the density of the layers of the rock formation in terms of the velocities of the rays.

11. The process as claimed in claim 5, in which the weighting factors are both time and offset variant and are dependent on the determined interval velocity function, the ratio of p-wave velocities to s-wave velocities, and an offset pattern of the common mid-point gather.

12. The process as claimed in claim 11, which includes displaying the outputs of the weighted stacks so formed as traces representing the p-wave reflectivity and s-wave reflectivity, both of which have the same time scale.

13. A process for directly detecting the presence of hydrocarbons in a rock formation which includes generating a plurality of seismic rays at spaced intervals from one another above or within the surface of the rock formation being surveyed to form a normal move-out corrected common mid-point gather;

determining at least approximately an angle of incidence for each seismic ray;

determining weighting factors, and applying the weighting factors to time samples of each of the reflected rays before stacking the time samples to form a trace;

extracting the reflectivity of compressional longitudinal waves (p-waves) and shear waves (s-waves) of each sample;

determining the p-wave reflectivity as a function of the s-wave reflectivity by comparing amptitudes of the traces representing the p-wave reflectivity and the s-wave reflectivity; and deriving a fluid factor by subtracting the p-wave reflectivity so determined from the extracted p-wave reflectivity, the fluid factor giving a direct indication of the presence of hydrocarbons in the rock formation being surveyed.

14. The process as claimed in claim 13, which includes determining the average velocities of the seismic rays through the rock formation.

15. The process as claimed in claim 14, which includes determining the average velocities from stacking velocities or borehole information.

16. The process as claimed in claim 14, which includes extracting from the determined, average velocities, p-wave interval velocities of the rays between interfaces of layers constituting the rock formation.

17. The process as claimed in claim 16, which includes utilizing curve fitting techniques to generate an interval velocity function from the p-wave interval velocities.

18. The process as claimed in claim 17, in which the curve-fitting techniques utilized are cubic splines curves.

19. The process as claimed in claim 17, which includes determining the angles of incidence of each ray from the interval velocity function using interative ray tracing.

20. The process as claimed in claim 17, which includes determining the ratio of p-wave velocities and s-wave velocities by means of a relationship which is dependent on the lithology of the rock formation being surveyed.

21. The process as claimed in claim 20, which includes deriving the relationship from cross-plots of borehole measurements using p-wave and s-wave velocity logging.

22. The process as claimed in claim 16, which includes determining the density of the layers of the rock formation in terms of the velocities of the rays.

23. The process as claimed in claim 17, in which the weighting factors are both time and offset variant and are dependent on the determined interval velocity function, the ratio of p-wave velocities to s-wave velocities, and an offset pattern of the common mid-point gather.

24. The process as claimed in claim 23, which includes displaying the outputs of the weighted stacks so formed as traces representing the p-wave reflectivity and s-wave reflectivity, both of which have the same time scale.

* * * * *

UNITED STATES PATENT AND TRADEMARK OFFICE
CERTIFICATE OF CORRECTION

PATENT NO. : 4,817,060

DATED : March 28, 1989

INVENTOR(S) : GEORGE C. SMITH

It is certified that error appears in the above-identified patent and that said Letters Patent is hereby corrected as shown below:

Column 7, line 48, "$\rho$" should be -- $\sigma$ --.

Signed and Sealed this

Fifth Day of December, 1989

Attest:

JEFFREY M. SAMUELS

Attesting Officer     Acting Commissioner of Patents and Trademarks